July 21, 1931.  R. HAMBURGER  1,815,200
DEVICE FOR ASSISTING IN THE LAUNCHING AND LANDING OF AEROPLANES
Filed March 13, 1929  2 Sheets-Sheet 2
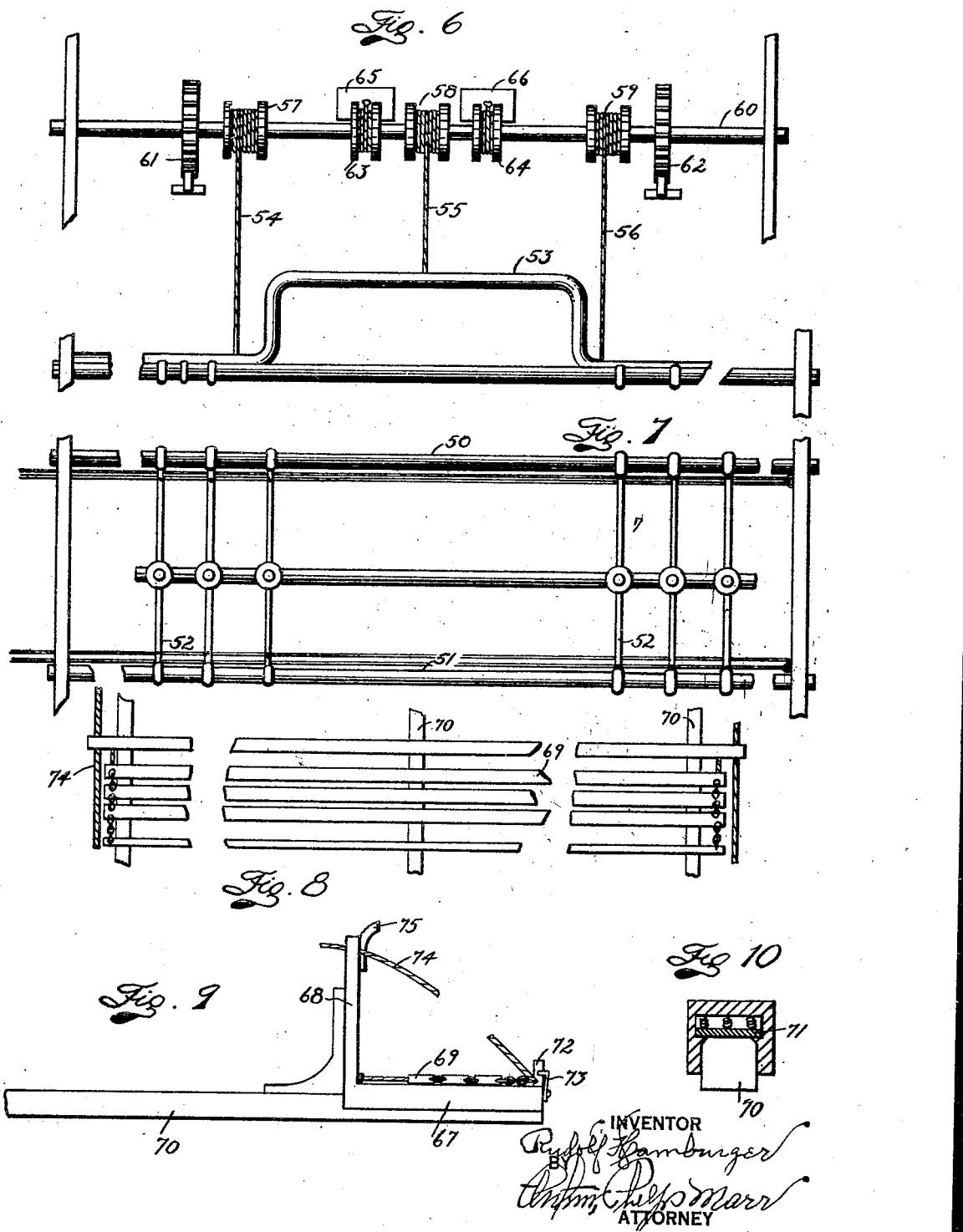

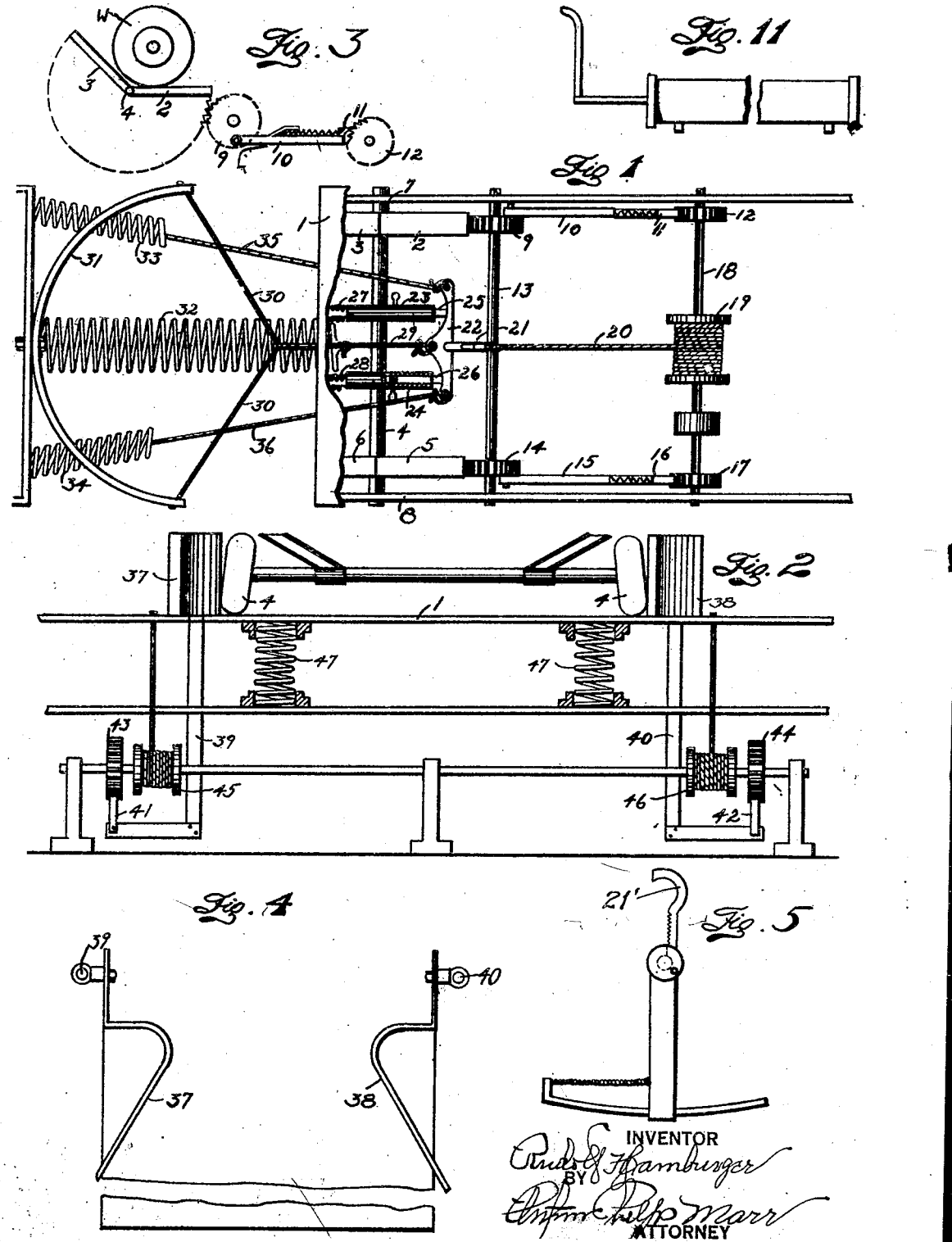

Patented July 21, 1931

1,815,200

UNITED STATES PATENT OFFICE

RUDOLF HAMBURGER, OF NEW YORK, N. Y.

DEVICE FOR ASSISTING IN THE LAUNCHING AND LANDING OF AEROPLANES

Application filed March 13, 1929. Serial No. 346,547.

The devices, the subject of this invention, have to do with the launching and landing of aeroplanes, and a particular object of the invention is to expedite the launching and landing, making it possible to launch or land an aeroplane in a restricted area.

A principal object of the invention is to increase the speed of the aeroplane in the take-off, and to quickly and safely decrease the speed of the aeroplane when it is landing.

The following is what I consider the best means of carrying out my invention, and the accompanying drawings should be referred to for a complete understanding of the specification which follows.

In the drawings:—

Fig. 1 is a view of a portion of my launching device.

Fig. 2 is an elevation of another portion of the launching device.

Fig. 3 shows a detail of the structure shown in Fig. 2.

Fig. 4 shows a detail of the structure shown in Fig. 2.

Fig. 5 shows a detail of the check shown in Fig. 1.

Fig. 6 is a top plan view of the landing device.

Fig. 7 is a front elevation of this device.

Fig. 8 shows a plan view of a detail of the landing device.

Fig. 9 is a side elevation of a slidable member used in conjunction with Fig. 6 to 8, inclusive, and Fig. 10 is an enlarged view of the brake mechanism, Fig. 11, a view of a modification of a part.

Similar reference numerals indicate like parts in all the figures where they appear.

At 1, in Fig. 1, I show a platform, and arranged under this platform, is a sector 2, a portion 3, of which projects above the platform.

In Fig. 3, I show at W, one of the landing wheels of an aeroplane, resting on the sector and against the upwardly projecting portion 3 thereof. The sector 2 is received upon a shaft 4, and a directly opposite sector 5 is of the same general construction as the sector 2, and has an upwardly projecting portion 6. Suitable bearings, such as frame members 7 and 8 are provided for the shaft 4, and for other shafts to be later described.

In mesh with the sector 2, is a pinion 9, having an eccentric crank 10, which operates a ratchet 11, which normally engages a ratchet wheel 12. The pinion 9, is mounted upon a shaft 13, and a second pinion 14 also mounted upon this shaft, is in mesh with the sector 5. The second pinion 14 is provided with a link or lever 15, having a ratchet 16 in engagement with the teeth of a ratchet wheel 17.

Both ratchet wheels 12 and 17 are mounted upon a shaft 18 whereon is also secured a drum 19, for the reception of a cable 20, the cable engaging a hook 21 which hook is provided with a cross-bar 22.

Rotatable upon the shaft 4, are sockets 23 and 24, each provided with an extension pin, as shown at 25 and 26, engaging the cross-bar 22. The sockets are provided with springs 27 and 28 for a purpose that shall appear later.

A cable 29 extending from the bar 22 of the hook 21 is secured to a second cable 30, the ends of the second cable being secured to a bow string 31, and an additionl spring 32 may also be secured to the cable 29, and so as to get an even pull and a multiple point engagement, I may add springs 33 and 34, each provided with cables 35 and 36, which are secured to the cross-bar 22.

An aeroplane being arranged upon the platform, is allowed to move forward by the rotation of its propeller until the wheels 4 strike the upwardly portions 3 and 6 of the sectors 2 and 5. The movement of the sectors will cause the withdrawal of the ratchets 11 and 16 and the freeing of the drum 19, and thereupon the springs 31 and 32 will move the hook 21 forward to engage the axle, or any other convenient portion of the under frame of an aeroplane. The impact of engagement is softened by the check members 23 and 24, but these check members only serve to soften the impact. The springs may continue to exert their pull, whereupon the check members will rotate on their shaft 4, freeing the cross-bar 22, and allowing the springs through the medium of the hook 21, to pull the aeroplane along at a very high rate of speed.

The platform 1 continues as the platform 1 in Fig. 2, and at a remote point thereon; at a point whereat I shall determine the speed is sufficiently great. The wheels 4—4 of the aeroplane will pass between semi-rotatable guides 37 and 38, rotating these guides upon their pivots 39 and 40, and at the same time rotating the ratchets 41 and 42 out of engagement with their ratchet wheels 43 and 44, thus allowing the cable on the drums 45 and 46 sufficient freedom to allow a section of the platform 1 to be raised by means of two or more springs 47.

The upward movement of this platform may be to any extent, and I intend that it shall be sufficient to launch the aeroplane into the air. This rising of the aeroplane, in addition to the great speed imparted by the springs 31, 32, 33 and 34, will make it possible to launch an aeroplane within a very short distance.

In Fig. 5, I show a hook 21′, adjustable as to height, and which may be used as a substitute for the hook shown in Fig. 1.

In Fig. 11, I show merely a piston and cylinder, and I do this to indicate that I may employ compressed air for the movement of the hook 21 in lieu of the springs. However, I believe that the springs will impart a higher launching speed.

And now for the purpose of landing, I provide a device shown in Figs. 6 and 7. This device consists of a plurality of bars 50 and 51. Arranged between these bars, are elastic members 52. Any number of these elastic members may be employed, but it is desirable that space be allowed between the two innermost elastic members, so that the body of a plane may pass there between the wings of the plane engaging the elastic members. A bar 53 merely serves as a spreader for the elastic members, and as a means of attaching a plurality of cables 54, 55 and 56. The cables pass over drums 57, 58 and 59 arranged upon a shaft 60, the shaft being provided with a plurality of ratchets 61 and 62, and this shaft being also provided with additional drums 63 and 64, having cables which terminate in weights 65 and 66.

Now as the aeroplane reaches the elastic members, the bar 53 is moved inward, and the slack of the cable 54 and 56 is taken up by their drums, so that when the aeroplane loses speed, the elastic members cannot snap it back, the weights serving to wind up the cables and the ratchet wheels 61 and 62 working in conjunction with the weights, prevent a throw back of the elastic members.

In Figs. 8, 9 and 10, I provide a short platform 67 having an upright 68, and arranged upon this short platform, are a plurality of loose wooden cleats 69, secured together. The platform 67 travels on a plurality of rails 70. The rails may be steel rails, and in Fig. 10, I show a spring pressed brake shoe 71, resting upon the rail 70. Now as the landing wheels of the aeroplane strike the bar 72 it is disengaged from the hook 73, or from any other suitable securing means, and thereupon the cable 74 is freed, and as the wheels of the aeroplane advance over the bars 69, the cable may pull up these bars behind the wheels of the aeroplane, preventing the wheels from rotating backward. When the wheels strike the upright 68, the whole carriage 67 and the parts associated therewith, will slide forward upon the rails 70. The brake shoe 71 retards the forward movement. The member 75, which may be a hooked shaped member, will engage a suitable point on the frame or the under-carriage of the aeroplane, to prevent a nose dive, or to prevent the plane diving over the upright 68.

It will of course be understood that modifications may be made within the scope of the appended claims without departing from the principle or sacrificing the advantages of this invention.

Having carefully and fully described my invention, what I claim and desire to secure by Letters Patent is:—

1. A launching device for aeroplanes comprising a platform, a plurality of resilient members, tension members retained by said resilient members, means for engaging an aeroplane, means for releasing said tension devices to cause them to expedite the movement of said aeroplane, and means for elevating said aeroplane at a pre-determined point in its forward movement.

2. A launching device for aeroplanes comprising a platform, a plurality of tension members, a plurality of resilient members for tensioning said tension members, means for engaging an aeroplane, means for releasing said tension devices to cause them to expedite the movement of said aeroplane, and means for elevating said aeroplane at a pre-determined point in its forward movement, said means comprising a plurality of resilient members, and means for retaining them temporarily compressed.

3. Means for launching an aeroplane comprising a plurality of spring members, a hooked member for engaging said aeroplane, a cable for retaining said resilient members under tension, a ratchet and a sector for operating said ratchet to release said tension members by the movement of the aeroplane.

4. Means for launching an aeroplane comprising a plurality of spring members, a hooked member for engaging said aeroplane, a cable for retaining said resilient members under tension, a ratchet and a sector for operating said ratchet to release said tension members by the movement of the aeroplane, and in combination therewith, a second resiliently operated member adapted to elevate said aeroplane and having means thereon, for releasing said member by the passage of the aeroplane through guides associated with said member.

RUDOLF HAMBURGER.